United States Patent [19]
Douglas

[11] 3,762,299
[45] Oct. 2, 1973

[54] EXPOSURE CONTROL MECHANISM

[75] Inventor: Lawrence M. Douglas, South Easton, Mass.

[73] Assignee: Polaroid Corporation, Cambridge, Mass.

[22] Filed: Apr. 21, 1972

[21] Appl. No.: 245,802

[52] U.S. Cl. .................................... 95/56, 95/63
[51] Int. Cl. ........................ G03b 9/14, G03b 9/42
[58] Field of Search ........... 95/10 C, 10 CE, 10 CT, 95/10 CD, 64 R, 64 D, 53 E, 53 EA, 53 EB, 63, 56, 55

[56] References Cited
UNITED STATES PATENTS

| | | | |
|---|---|---|---|
| 3,672,267 | 6/1972 | Harvey et al. | 95/53 EA X |
| 3,511,145 | 5/1970 | Ort | 95/10 CD |
| 3,662,659 | 5/1972 | Metzger et al. | 95/10 CD |
| 3,664,245 | 5/1972 | Bresson et al. | 95/10 CD |
| 3,665,826 | 5/1972 | Kavpol | 95/10 CD |

Primary Examiner—Joseph F. Peters, Jr.
Attorney—Charles Mikulka et al.

[57] ABSTRACT

A dual-bladed exposure control mechanism of a variety actuated through selective energization of a solenoid operating in conjunction with a walking beam-exposure mechanism blade combination. The mechanism includes an opening spring, normally biasing the walking beam to open the exposure mechanism blades, which is connected for co-rotation with a drum defining a first winding surface. This winding surface is connected through a belt to the plunger of the noted solenoid. A second belt portion is connected from the first winding surface to a second winding surface formed upon the walking beam. Any tension in the latter belt occasioned from the opening spring bias is selectively negated upon energization of the solenoid and retraction of its internally disposed plunger. A closing spring connected with the walking beam serves to bias the beam and blades into a closed terminal position. De-energization of the solenoid permits the opening spring to drive the walking beam from the second belt portion to provide for a progressive opening of the exposure mechanism blades to define gradually increasing aperture widths.

18 Claims, 8 Drawing Figures

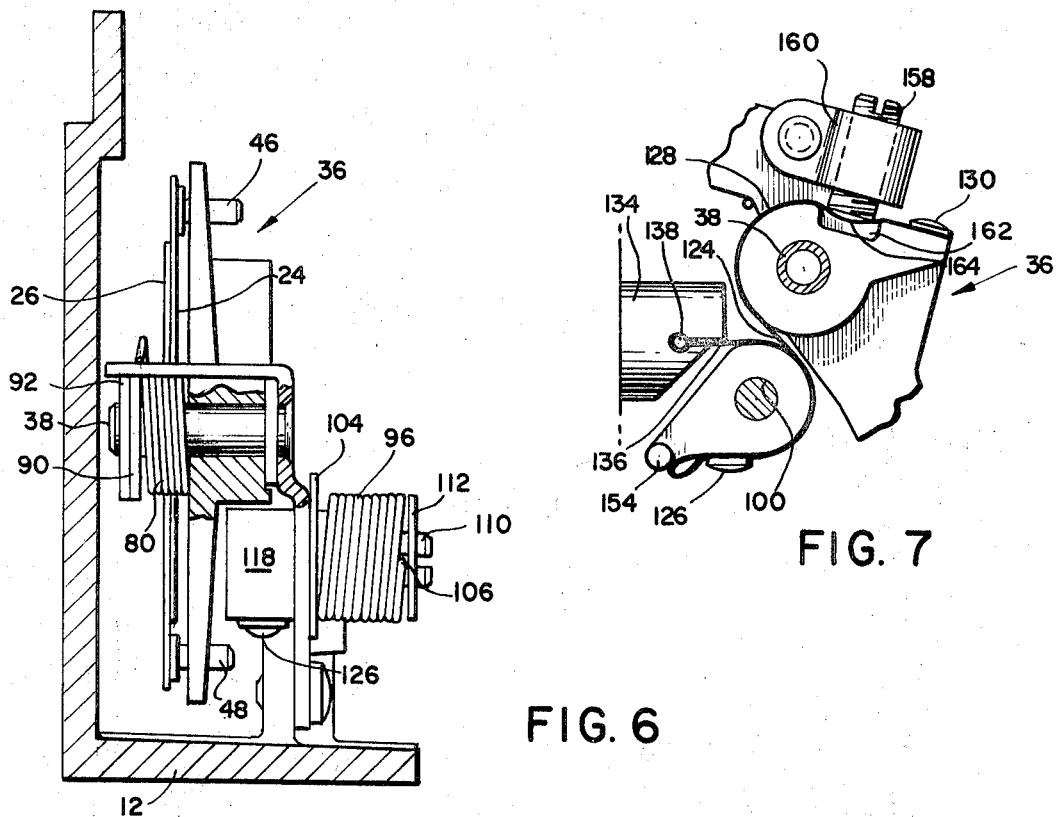
FIG. 6
FIG. 7
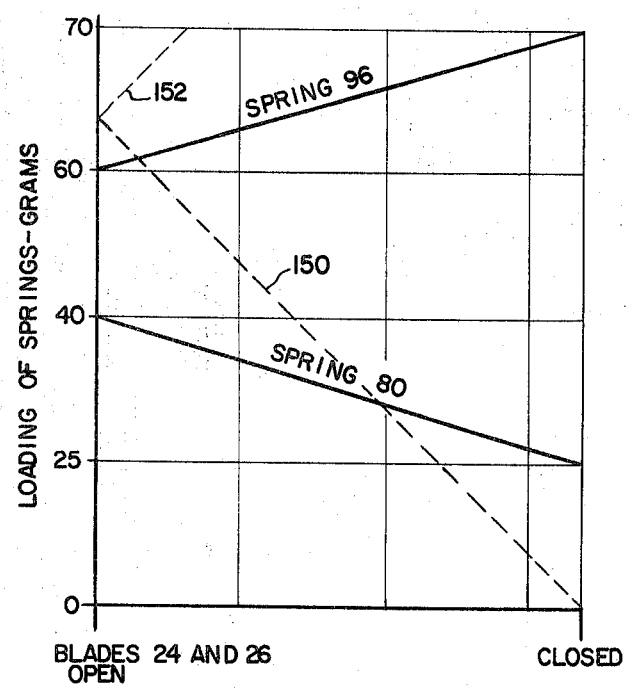
FIG. 8

EXPOSURE CONTROL MECHANISM

BACKGROUND OF THE INVENTION

An exposure control system embodying a shutter mechanism providing two parameter exposure control within an involved reflex photographic cycle is described in a U.S. Pat. No. 3,641,889, by V. K. Eloranta, entitled "Exposure Control System." Uniquely designed to be packaged within the very limited confines of the exposure control housing of a thin, compact camera, the exposure control system is characterized in the use of a tractive electromagnetic device, such as a solenoid, which is energized for the purpose of closing exposure mechanism blades. In a preferred embodiment of the system, two such exposure mechanism blades are provided which operate simultaneously and in synchronism through connection with a reciprocating "walking beam" type drive assembly. The latter assembly, in turn, is actuated by the noted solenoid as well as by a spring drive.

A technique for improving the dynamic performance of the above noted solenoid actuated exposure control system is described and claimed in another copending application for U.S. Pat. by C. C. Petersen, entitled "Dynamically Compensated Exposure Control System," Ser. No. 333,341, filed Feb. 16, 1973 which is, in turn, a continuation of application Ser. No. 245,800, now abandoned, filed of even date herewith and assigned in common herewith. With this compensation technique, the dynamic performance or motion imparted in consequence of energization of the drive solenoid is isolated from exposure mechanism blade movement. For instance, both opening and closing movement of the blades of the exposure mechanism is provided by springs evidencing consistently repeatable force values or rate characteristics. Through an arrangement by which the solenoid of the system is driven only against a substantially pure force value exhibited by one of the springs, the exposure control system is capable of operating with requisite statistical consistency even though the drive solenoid may be subjected to energy input variations from the power supply of a camera.

The above noted dynamic corrections necessarily add to the complexity of the mechanism of the new exposure control system, and, as a consequence, contribute to an increase in the bulk of the entire system. To incorporate this desirably compensated system within the very limited confines of an exposure control housing within a thin, compact camera, a mechanism which carries out all of the necessary functions of the system while remaining both simple and highly compact is needed. For instance, such a mechanism should not require any addition to the size of the exposure control housing within which it is situated.

SUMMARY OF THE INVENTION

The instant invention provides an exposure control mechanism of a variety suited for solenoid actuation. This mechanism incorporates dynamic compensation features utilizing components as well as an arrangement thereof permitting use of the mechanism within the very limited confines of the exposure control housing of a thin, compact photographic camera.

Compactness as well as the desirable simplicity of the mechanism is derived through a belt and dual winding surface arrangement. One such winding surface is configured for connection with the reciprocally mounted drive assembly of the mechanism, while the other such winding surface is formed as the periphery of a rotatably mounted drum. This drum is connected in driven relationship with an opening spring biasing the drum to rotate its winding surface in a direction winding the belt thereupon. The consequent bias is exerted through the belt into the reciprocating drive assembly to urge the exposure mechanism blades of the mechanism into an open position. The mechanism further includes a closing spring which is so mounted as to bias the reciprocating drive assembly for movement in a direction providing for the closure of the noted exposure mechanism blades. By connecting the noted drum with an actuator such as the earlier described solenoid, the influence of the opening spring upon the closing spring may be selectively negated. As a consequence of the mounting of the drum beneath and in alignment with the winding surface of the reciprocating drive assembly, the entire mechanism may be assembled within a highly confined space.

Another feature and object of the invention is to provide an exposure control mechanism of a variety including exposure mechanism blades movable between terminal positions in consequence of their connection with a reciprocally movable drive assembly such as a walking beam. This drive assembly is movable in consequence of the actuation of a tractive electromagnetic device such as a solenoid. The mechanism includes the improvement comprising a first winding surface fixed to and movable with the drive assembly, a rotatable drum defining a second winding surface and a belt connected to and windable between the noted first and second winding surfaces. A closing spring is provided for biasing the drive assembly to move in one direction, while an opening spring is connected with the drum to bias the noted second winding surface to rotate in a direction winding the belt and causing a resultant rotation of the first winding surface and consequent movement of the reciprocal drive assembly toward an open position. Additionally, means are provided coupling the drum with the plunger of the solenoid. In a preferred arrangement, the opening and closing springs are selected having a low or relatively flat rate characteristic so as to minimize the requisite pulling force required of the noted plunger.

Another object of the invention is to provide an exposure control mechanism including exposure mechanism blades or light valves which are movable between open and blocking positions to regulate the passage of light through an aperture. The blades are driven from a reciprocating drive such as a walking beam which is connected thereto. The walking beam is biased for rotation to close the light valve by a closing spring connected thereto, while it is biased for movement defining open light valve positions by an opening spring connected to the walking beam through a belt of finite length coupled between winding surfaces. One of these winding surfaces is coupled with the opening spring through the media of a drum and this drum is connected with the reciprocally movable plunger of a solenoid. The belt connection between the noted winding surfaces is such that when the plunger of the solenoid is retracted, tension within the belt is released and the walking beam is permitted to rotate under the bias of the noted closing spring free from the influence of the opening spring. Further, the noted solenoid is required to operate only under a load represented by the force values of the opening spring and such inertial characteristics as may be present within its plunger.

Other objects of the invention will, in part, be obvious and will, in part, appear hereinafter.

The invention, accordingly, comprises the mechanism and apparatus possessing the construction, combination of elements and arrangement of parts which is exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 6 is a side elevational view of the exposure mechanism of FIG. 1 with portions broken away or removed to reveal internal structure;

FIG. 7 is a fragmentary elevational view of certain components of the mechanism of FIG. 1;

FIG. 8 is a graph incorporating representative spring rate curves for the mechanism of the invention.

DETAILED DESCRIPTION

Figure 1:
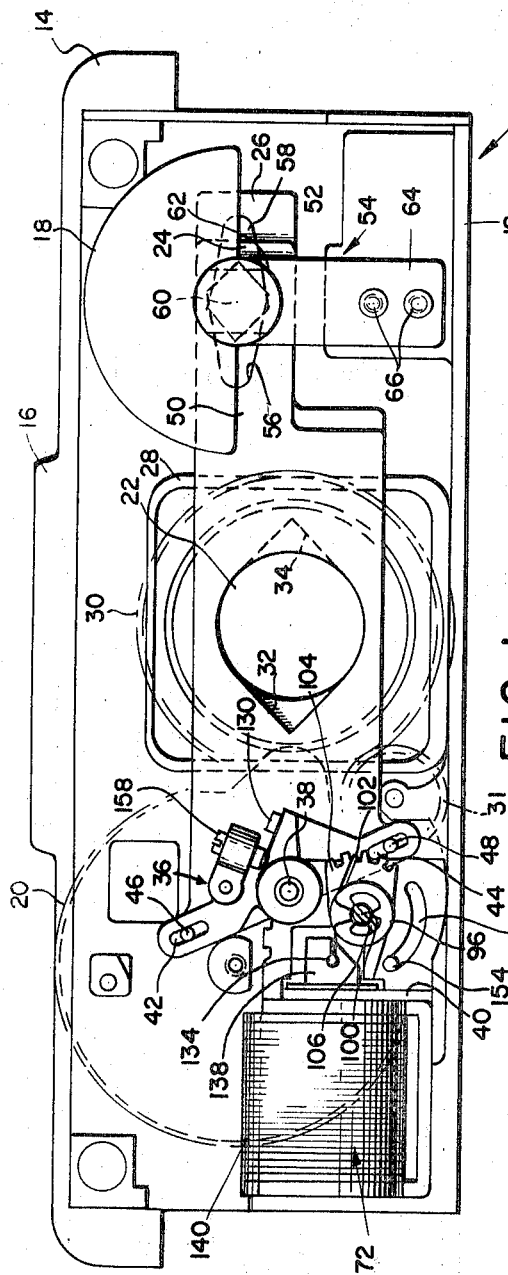
FIG. 1 is a front elevational view of an exposure control housing incorporating the exposure control mechanism of the instant invention and showing an orientation of components providing for the full unblocking of an exposure aperture.

The mechanism of the instant invention is particularly suited for use within the exposure control housing of a very thin and compact camera suited for carrying in the pocket of a garment. Such a camera has been described in U.S. Pat. No. 3,714,879, entitled "Reflex Camera" by E. H. Land, V. K. Eloranta, and I. Blinow. The exposure control housing of this camera must be foldable into a nested orientation with the other components thereof to achieve requisite compactness and, accordingly, the space available for all the components of a fully automated exposure system is extremely limited. Such components include focusing wheels, trim adjustment mechanisms, follow-focus actuating and trim systems, lens mounting and the like. A more detailed illustration of such components as they are fashioned for use within the exposure control housing is provided in a copending application for U.S. Pat. by L. G. Douglas, Ser. No. 168,671, entitled "Apparatus and System for Flash Photography," filed Aug. 3, 1971 and assigned in common herewith.

In the interest of facilitating the description of the mechanism of the instant invention, many of these above-cataloged components are deleted from the drawing and description to follow.

Referring to FIG. 1, a front sectional view of the noted exposure control housing is illustrated generally at 10. The principle supporting structure for housing 10 is present as a rear casting 12 which is selectively machined to support the components of the mechanism. Surrounding the front and top of casting 12 is a front cover 14 which is structured as at 16 to support a flash array and related components and which includes openings (not shown) through which protrude manually adjustable trim and focus wheels, the boundaries of which are shown respectively at 18 and 20.

Centrally disposed within the back wall of casting 12 is an annular exposure opening 22, the periphery of which substantially defines the largest available aperture width for the mechanism. The light valve assembly within housing 10 is present as a dual bladed exposure mechanism including blades 24 and 26. Blades 24 and 26 are slidably mounted within a bracket 28 fixed, in turn, to rear casting 12. Bracket 28 additionally serves as a support for an externally threaded lens housing or bezel, the periphery of which is illustrated by circular outline 30. Connection between bezel 30 and focus wheel 20 is provided by an idler gear shown in phantom at 31.

Blades 24 and 26, respectively, are configured having teardrop shaped openings 32 and 34 formed therewithin. Openings 32 and 34 are positioned within respective blades 24 and 26 in a reversed sense such that, as they symmetrically overlap, they combine to form a symmetrically configured aperture opening across exposure opening 22.

Figure 5:
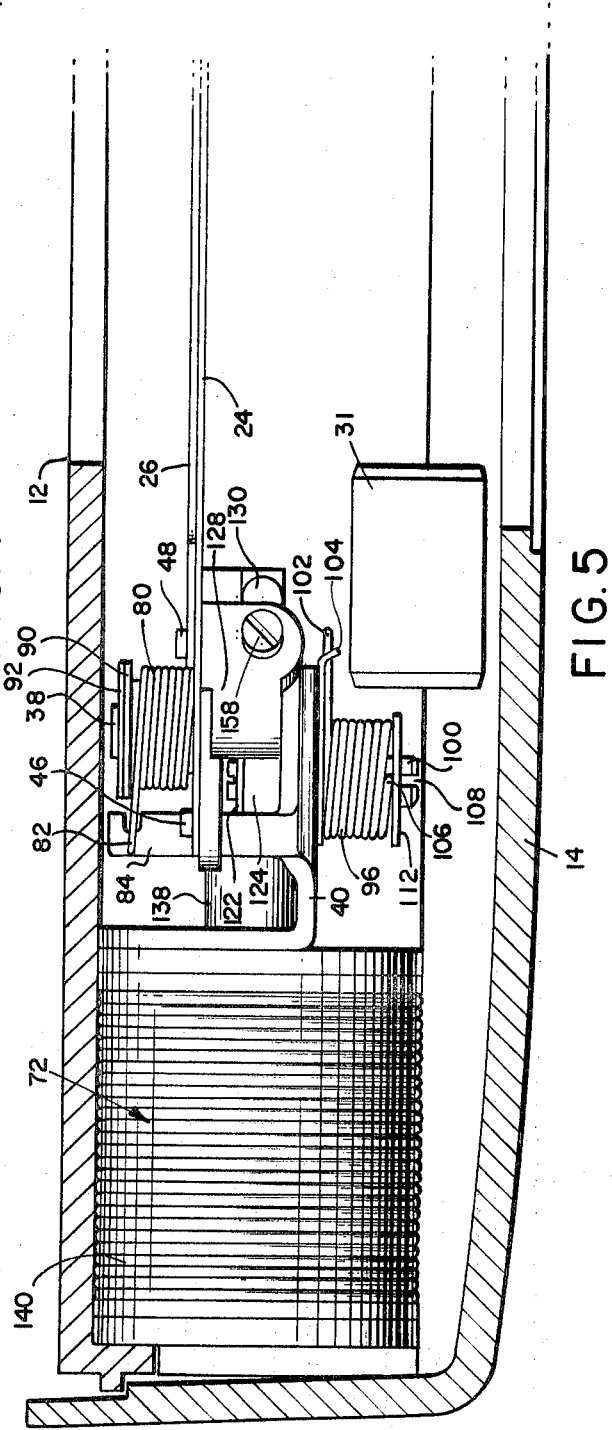
FIG. 5 is a top partial view of the exposure mechanism of FIG. 1.
Figure 3:
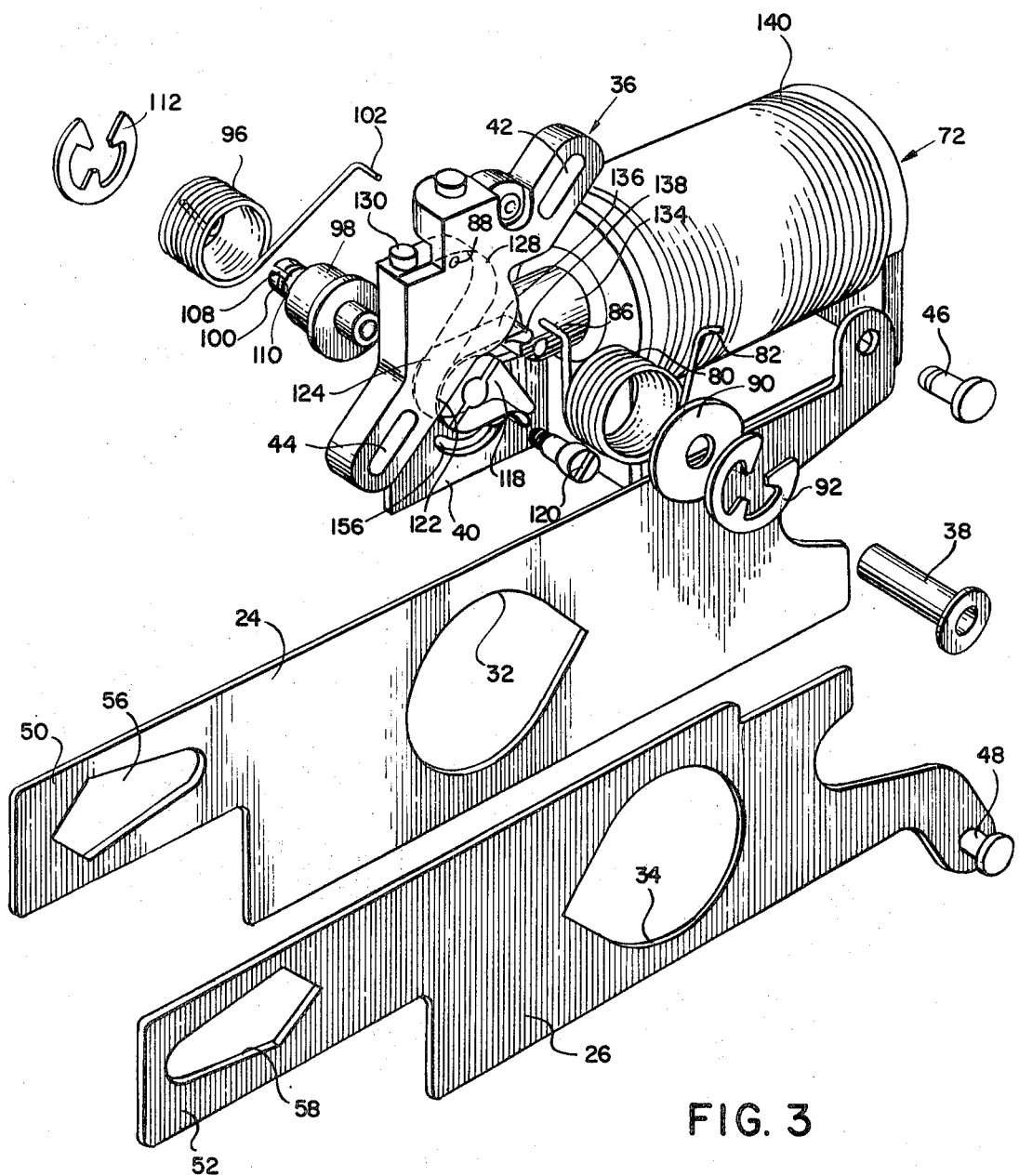
FIG. 3 is an exploded perspective view of the major components of the exposure mechanism of the invention.

The symmetry of the aperture openings defined by blades 24 and 26 is realized as a consequence of their connection with a reciprocally movable drive assembly or "walking beam" as shown generally at 36. Referring additionally to FIGS. 3 and 5, walking beam 36 is seen to be journalled for rotation about a stud or bushing 38 fixed to and extending from one face of an L-shaped bracket 40. Elongate slots as at 42 and 44 are formed in the outward tip portions of walking beam 36 for the purpose of providing connection with pins 46 and 48 fixed to and extending, respectively, from blades 24 and 26. Thus interconnected, the blades 24 and 26 may move simultaneously and in correspondence with each other to define symmetrically configured, variable apertural openings of progressively varying values over exposure opening 22. Elongate slots 42 and 44 serve the function of accommodating for the horizontally restricted movement of blades 24 and 26 along cords extending through the locus of rotation of the tips of beam 36.

Blades 24 and 26 also are configured having elongate portions respectively shown at 50 and 52 which extend through a light detecting station shown generally at 54. Elongate portions 50 and 52, respectively, are formed incorporating secondary openings 56 and 58 which are configured in light regulating correspondence with the configurations of respective openings 32 and 34. Secondary openings 56 and 58 are oriented upon respective elongate portions 50 and 52 in a manner wherein they overlap in a symmetrical and mutually reversed sense to define a secondary aperture opening 60 within light detecting station 54. Opening 60, in turn, is located intermediate the photosensing elements of an exposure control circuit and an entrance optical assembly including a lens assembly outlined at 62 and supporting bracket therefore shown at 64. Bracket 64 is connected by rivets as at 66 to rear casting 12. The instantaneous aperture openings defined at 60 are derived in synchronizm with those present at exposure opening 22. Accordingly, the selective attenuation of scene light entering detecting station 54 serves to modulate a resultant signal to provide an instantaneous aperture value input to the exposure control circuit. Such input permits the system to provide a two parameter exposure control.

Figure 2:
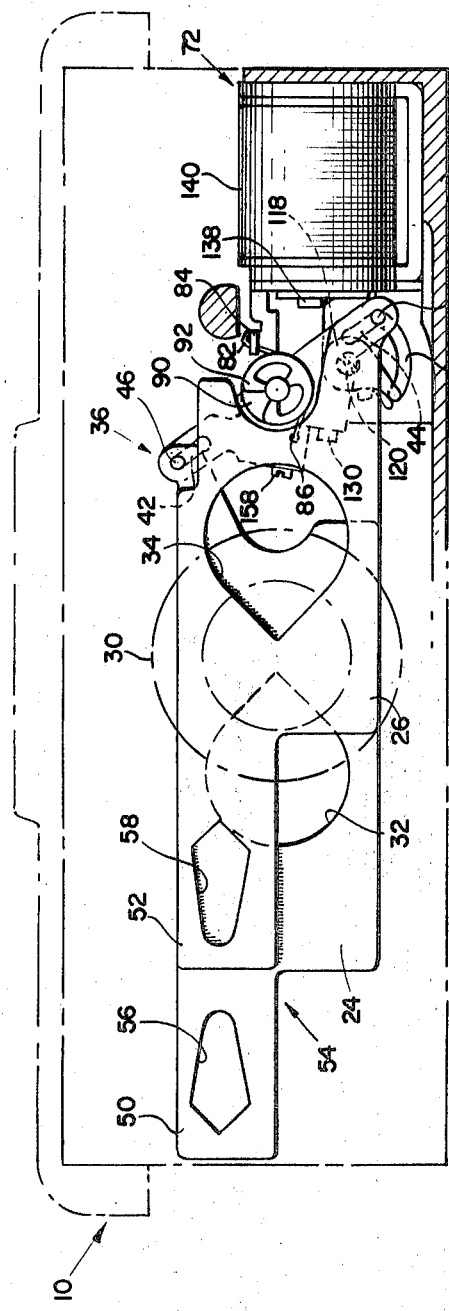
FIG. 2 is a partial rear elevational view of the exposure control housing of FIG. 1 showing the exposure mechanism components thereof as they are oriented to provide for the complete blocking of an exposure aperture.
Figure 4:
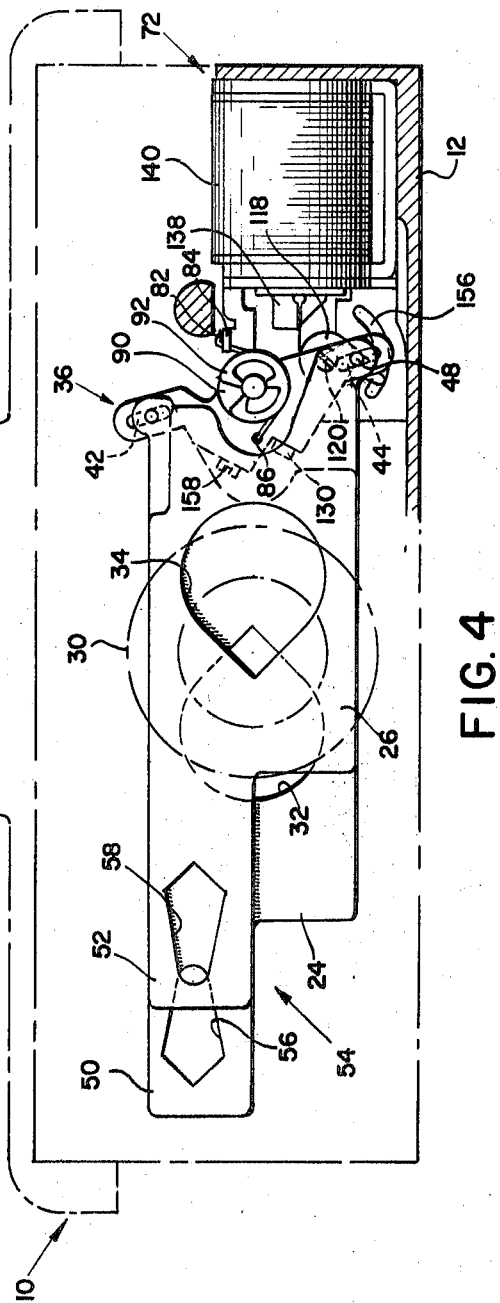
FIG. 4 is a partial rear elevational view of the exposure control housing of FIG. 1 showing an orientation of exposure mechanism components as they define an aperture opening of intermediate value.

To operate in conjunction with the program of a reflex photographic cycle, blades 24 and 26 must be actuated in a manner whereby openings 32 and 34 define an aperture of maximum available width prior to the commencement of such cycle. This normally open shutter condition, as shown in FIG. 1, facilitates viewing and focusing procedures. When operated to define an interval of exposure, exposure mechanism blades 24 and 26 are driven into an orientation wherein they fully block exposure opening 22. This closed orientation is shown in FIG. 2. An exposure interval is defined by moving the blades in synchronizm to gradually open and define progressively varying aperture values until a predetermined exposure value is reached. When this value is reached, for instance, as illustrated in FIG. 4, a tractive electromagnetic device in the form of a solenoid such as that depicted at 72 is energized to terminate the exposure interval by actuating the blades to return them to their terminal position blocking the exposure opening.

Consistent dynamic performance of the mechanism in driving blades 24 and 26 between open orientations and a closed terminal position is realized through an arrangement wherein solenoid 72 is coupled to be operated substantially only against the force of a spring bias, while movement of blades 24 and 26 with their attendent mass-accellerative and frictional characteristics is supplied from springs.

Referring to FIGS. 1, 3, 5 and 6, walking beam 36 is seen to be biased to rotate about stud 38 in a manner urging blades 24 and 26 to define an apertural opening of maximum width by an opening spring 96. Configured in multiple turn helical and spirally wound fashion, spring 96 is slidably mounted upon a cylindrical, centrally bored stud 98, one end of which is fixed to a face of bracket 40. Journalled for rotation within stud 98 and extensible through bracket 40 is an axle 100, the end or tip portions of which are internally bored and tapped. The stationary end 102 of opening spring 96 is insertable within one tooth of a grounded comb assembly 104, while its movable end is inserted within a slot 108 extending into axle 100. Th windings of coils of spring 96 are retained upon stud 98 by an assembly including groove 110 and an E-ring 112.

Thus connected, spring 96 asserts a rotational bias upon and is loaded or driven from axle 100. Axle 100, in turn, extends through bracket 40 and is rigidly connected with a drum 118. A bolt 120 retains drum 118 upon axle 100.

Looking additionally to FIG. 7, drum 118 is configured having a winding surface 122 of generally semicircular shape. Surface 122 serves to selectively wind a band or belt 124. Belt 124 is of finite length and is connected to drum 118 by a rivet 126. The opposite end of belt 124 is wound about another winding surface 128 formed integrally within walking beam 36. Winding surface 128 is of cylindrical configuration and is arranged to rotate about the axis of stud 38. A rivet 130 connects the other end of belt 124 to the terminus of winding surface 128. Thus connected, the belt 124 is windable about surfaces 122 and 128 and serves to selectively assert a rotational bias from opening spring 96 into walking beam 36. Spring 96 is configured having predetermined preloaded conditions and is designed having a rate or force characteristic serving to normally bias exposure mechanism blades 24 and 26 into the fully open condition illustrated in FIG. 1.

Referring to FIGS. 2 through 6, bracket 40 also is seen to support a closing spring 80. Formed in a multiple turn, helical or spirally wound fashion, spring 80 is slidably mounted about stud 38 in position above drum 118 and is oriented having its stationary end 82 abutting against and connected with an extension 84 of bracket 40. The moving end 86 of spring 80 is configured to be inserted within an opening 88 formed within walking beam 36 above its center of rotation. Spring 80 is retained upon stud 38 by a connector assembly including a washer 90 and E-ring 92. Spring 80 is mounted under predetermined preloading conditions, such loading being of lesser value than the loading values exhibited by spring 96. Looking additionally to FIGS. 1 and 7, drum 118 is shown to be connected to the plunger 134 of solenoid 72. This connection is provided by a second belt or band portion 136 of belt 124 wound about winding surface 122 beneath belt 124 and coupled with rivet 126 and at a pin and slot union 138 formed within plunger 134. Solenoid 72 also includes an excitation winding 140 which, when energized, serves to cause the retraction of plunger 134 thereinto. Accordingly, when solenoid 72 is energized, plunger 134 is retracted to, in turn, unwind belt 136 from winding surface 122 causing the rotation of drum 118. As drum 118 is thus rotated, opening spring 96 is wound and tension within belt 124 otherwise induced from opening spring 96 is relieved or negated. Accordingly, blades 24 and 26 of the exposure mechanism are permitted to close under the drive of closing spring 80.

Referring additionally to FIG. 8, the characteristics of spring 96 and 80 are revealed in more detail. To achieve requisite performance of the exposure mechanism, it is necessary that opening spring 96 be selected having a higher loading characteristic or exhibit higher force values than closing spring 80. As shown in the chart relating relative position of blades 24 and 26 with spring loads, opening spring 96 operates from a preloaded force value of about 60 grams, when blades 24 and 26 are open, to a fully loaded force value of about 70 grams, when blades 24 and 26 are fully closed. Note, additionally, that the loading characteristic of spring 96 is selected as being both constant and of relatively flat rate. The latter flat rate characteristic is achieved through the incorporation of a multitude of spiral turns within the spring.

Closing spring 80, being wound by opening spring 96 during opening motion of blades 24 and 26, evidences a loaded force value of about 40 grams and an unloaded value of about 25 grams. Spring 80 further evidences a relatively flat rate characteristic derived from its multiple turn design.

With the spring arrangement shown, blades 24 and 26 of exposure mechanism 10 are driven from a closed orientation towards open positions by the repearable or consistent force values of opening spring 96. In driving walking beam 36 to achieve this opening, spring 96 is called upon to work against the mass-accelleration characteristics of blades 24 and 26, their frictional retardation characteristics as well as the loading force values exhibited at spring 80. When excitation winding 40 of solenoid 72 is energized to terminate an exposure, plunger 134 is withdrawn to wind drum 118, thereby permitting spring 80 to rotate walking beam 36 in a closing direction. During this closing motion, solenoid 72 retracts belt 136, thereby winding drum 118 at a rate sufficient to release all tension within belt 124. Accordingly, walking beam 36 is driven only from closing spring 80. Inasmuch as spring 80 evidences consistent and repeatable force values, the closing motion of blades 24 and 26 is ideally consistent.

The relatively flat rate selected for springs 80 and 96 advantageously reduces the amount of power required of solenoid 72. As evidenced in FIG. 8, a loading value increment (for instance, that in evidence between the 40 and 60 gram levels of the graph) is needed in order to permit the loading of spring 80 by spring 96. Through the use of a relatively flat rate, the ultimate load imposed upon solenoid 72 is, disregarding safety factors, about 70 grams. Should conventional rate springs be utilized in lieu of the flat rate springs shown at 80 and 96, spring rate curves as at 150 and 152 must be considered in the design of the mechanism.

Note that a closing spring of constant higher rate as shown at curve 150 would result in a full loading requirement of over 60 grams. A requisite opening spring rate as shown at curve 152 would commence well above the 60 gram position and require a solenoid design having a power output characteristic of much higher levels than those required of the instant mechanism. Where power supplies for the solenoids as at 72 are limited, such loading or power requirements are usually found to be unacceptable.

The travel of spring driven drum 118 is limited in one direction by virtue of its connection by belt 124 and is limited in the opposite direction by a stop arrangement including a cylindrical projection 154 extending therefrom and into an arcuate slot 156. The latter stop arrangement is revealed in FIGS. 1 through 4.

Looking additionally to FIGS. 5 and 7, a calibrating arrangement for the exposure mechanism is revealed. Inasmuch as the retracting force exerted by plunger 134 is related to the travel of the plunger, it is necessary that the mechanism not only be calibrated to establish apertures of maximum width when fully opened but also to limit plunger travel to a minimum. Appropriate calibration is simply realized with the instant mechanism through a selective adjustment of the length of belt 124. This adjustment can be carried out by an adjusting screw 158 threadably mounted within a collar 160 formed within walking beam 36. Collar 160 is so positioned upon walking beam 36 as to orient screw 158 above belt 124 as it passes over a notch or detent 162. Rotation of screw 158 moves its blunt end 164 into and out of engagement with band 124 providing for a lengthening or shortening thereof, as it is connected between winding surfaces 122 and 128. Note that this adjustment is made from positions easily accessible within the compact mechanism.

The positioning of drum 118 beneath and in coaxial alignment with winding surface 128 advantageously results in a highly compact design, a feature of considerable importance in the thin compact housing illustrated. Further, the positioning of springs 80 and 96 upon the same bracket retaining walking beam 36 and drum 118 allows for desirable modular construction as well as enhancing the noted requisite compactness.

Since certain changes may be made in the above described photographic apparatus and system without departing from the scope of the invention herein involved, it is intended that all matter contained in the above description or shown in the accompanying drawings shall be interpreted as illustrative and not in a limiting sense.

What is claimed is:

1. In an exposure control mechanism of a variety including at least one exposure mechanism blade movable between a terminal position blocking the passage of light through an exposure aperture and positions unblocking the passage of light through said aperture, said blade being connected with and drivably moved between said positions by a reciprocably movable drive assembly, said drive assembly being movable in one direction in conjunction with the selective energization of a tractive electromagnetic device having a movable actuating element the improvement comprising:
   means defining a first winding surface fixed to and movable with said drive assembly;
   drum means defining a rotatable second winding surface;
   belt means connected to and windable between said first and second winding surfaces;
   first spring means for biasing said drive assembly to move in said one direction;
   means connecting said tractive electromagnetic device actuating element and said drum means for rotating said second winding surface in a direction unwinding said belt means when said actuating element is moved in response to a said energization of said tractive electromagnetic device; and
   second spring means connected with said drum means for biasing said second winding surface to rotate in a direction winding said belt means thereupon.

2. The mechanism of claim 1 in which said first and second spring means are present as substantially flat rate springs.

3. The mechanism of claim 1 in which said second spring means is selected having force values for said bias which are greater than the force values of the said bias of said first spring means.

4. The mechanism of claim 3 in which said second spring means is operative to rotate said drum means in a direction winding said belt means about said second winding surface and unwinding said belt means from said first winding surface when said tractive electromagnetic device is de-energized from an energized state.

5. The mechanism of claim 1 in which said connecting means includes a second belt means connected between said actuating element and said drive means and configured and arranged for selective winding about said second winding surface.

6. The mechanism of claim 1 including bracket means for supporting said reciprocably movable drive assembly for rotation about a given axis, said bracket means being configured for supporting said drum means for rotation about another axis parallel to said given axis.

7. The mechanism of claim 6 in which said bracket means and said drum means are mutually configured to limit the extent of rotation of said second winding surface.

8. The mechanism of claim 6 in which said second spring means is helically configured and spirally wound about said other axis.

9. The mechanism of claim 8 in which said second spring means is configured having a grounded end and movable end, and said movable end is connected to rotate said drum means second winding surface.

10. The mechanism of claim 1 in which:
said belt means is connected to define a finite length thereof between said first and second winding surfaces; and
including adjusting means for selectively varying the windable extent of said belt means so as to provide for the calibration of the extent of said movement of said drive assembly and said actuating element.

11. The mechanism of claim 1 including:
bracket means for supporting said reciprocally movable drive assembly for rotation about a given axis; and
wherein said first spring means is configured helically and spirally wound about said axis.

12. The mechanism of claim 11 in which said first winding surface is formed integrally with said reciprocally movable drive assembly and is present as the surface of a righr cylinder the axis of which coincides with said given axis.

13. An exposure control mechanism for photographic apparatus comprising:
valve means movable between a terminal position blocking the passage of light along an optical path and open positions unblocking said light passage;
reciprocating drive means connected with said valve means and movable in one direction to drive said valve means toward said terminal position and in a reverse direction to drive said valve means toward said open positions;
first spring means for urging said reciprocating drive means to move in said one direction;
means defining a first winding surface fixed to and movable with said reciprocating drive means;
drum means defining a rotatable second winding surface;
belt means connected to each and windable between said first and second winding surfaces;
second spring means connected with said drum means for biasing said second winding surface to rotate in a direction winding said belt means thereupon, said bias being assertable through said belt means and said first winding surface to bias said reciprocating drive means for movement in said reverse direction;
actuator means including an element reciprocally movable between retracted and extended positions respectively during drive and relaxed modes; and
means connecting said actuator means element and said drum means for rotating said drum means second winding surface in a direction unwinding said belt means during said drive mode and for effecting said biased rotation winding said belt means during said relaxed mode.

14. The mechanism of claim 13 in which said first and second spring means are present as substantially flat rate springs.

15. The mechanism of claim 13 in which said second spring means is selected having force values for said bias which are greater than force values generated from said first spring means.

16. The mechanism of claim 13 in which said second spring means is operative to rotate said drum means in a direction winding said belt means about said second winding surface and unwinding said belt means from said first winding surface during said relaxed mode.

17. The mechanism of claim 13 in which said connecting means includes second belt means connected between said actuator means element and said reciprocating drive means and configured and arranged for selective winding about said second winding surface.

18. The mechanism of claim 17 in which said actuator means is present as a solenoid having an excitation winding and said element thereof is present as a plunger retractable thereinto when said excitation winding is energized to establish said drive mode.

* * * * *